(12) United States Patent
Dunne

(10) Patent No.: US 6,440,356 B2
(45) Date of Patent: Aug. 27, 2002

(54) APPARATUS FOR INJECTING GAS INTO A VESSEL

(75) Inventor: Martin Joseph Dunne, West Midland (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/761,414

(22) Filed: Jan. 16, 2001

(30) Foreign Application Priority Data

Jan. 31, 2000 (AT) .............................................. PQ5355

(51) Int. Cl.⁷ ................................................ C21C 5/32
(52) U.S. Cl. ..................... 266/225; 266/270; 266/46
(58) Field of Search ..................... 266/46, 225, 268, 266/265, 270, 217

(56) References Cited

U.S. PATENT DOCUMENTS

| | | | |
|---|---|---|---|
| 4,251,271 A | * 2/1981 | Floyd ......................... | 266/225 |
| 4,572,482 A | 2/1986 | Bedell | |
| 4,951,928 A | * 8/1990 | Eysn et al. ................. | 266/225 |
| 5,350,158 A | * 9/1994 | Whellock .................... | 266/46 |
| 5,443,572 A | 8/1995 | Wilkinson et al. | |
| 5,498,277 A | 3/1996 | Floyd et al. | |

FOREIGN PATENT DOCUMENTS

| | | |
|---|---|---|
| AT | B 22448/88 | 9/1988 |
| GB | 2 088 892 | 8/1981 |
| WO | WO 93/06251 | 4/1993 |
| WO | WO 96/31627 | 10/1996 |

OTHER PUBLICATIONS

U.S. patent application Ser. No. 09/509,286, McCarthy et al., filed Mar. 21, 2000.

* cited by examiner

Primary Examiner—Scott Kastler
(74) Attorney, Agent, or Firm—Merchant & Gould, P.C.

(57) ABSTRACT

Apparatus for injecting gas into a vessel comprises a lance 26 having a gas flow duct 31 extending longitudinally from a rear end to a forward end (36) from which to discharge gas from the duct. An elongate body 38 disposed within the forward end of the duct is fitted with flow directing vanes 39 to impart swirl to the discharging gas. The tip 44 is internally cooled by water supplied and returned through supply and return passages 52, 56. Cooling water is also passed through internal cooling passages 66, 75, 76, 87 within vanes 39 and central body 38 via water supply and return passage 60 within the duct.

20 Claims, 6 Drawing Sheets

APPARATUS FOR INJECTING GAS INTO A VESSEL

BACKGROUND OF THE INVENTION

The present invention provides an apparatus for injecting gas into a vessel. It has particular, but not exclusive application to apparatus for injecting a flow of gas into a metallurgical vessel under high temperature conditions. Such metallurgical vessel may for example be a smelting vessel in which molten metal is produced by a direct smelting process.

A known direct smelting process, which relies on a molten metal layer as a reaction medium, and is generally referred to as the HIsmelt process, is described in International application PCT/AU96/00197 (WO 96/31627) in the name of the applicant.

The HIsmelt process as described in the International application comprises:

(a) forming a bath of molten iron and slag in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. To promote effective post combustion of the gases in the upper part of the vessel, it is desirable that the incoming hot air blast exit the lance with a swirling motion. To achieve this, the outlet end of the lance may be fitted with internal flow guides to impart an appropriate swirling motion. The upper regions of the vessel may reach temperatures of the order of 2000° C. and the hot air may be delivered into the lance at temperatures of the order of 1100–1400° C. The lance must therefore be capable of withstanding extremely high temperatures both internally and on the external walls, particularly at the delivery end of the lance which projects into the combustion zone of the vessel. The present invention provides a lance construction which enables the relevant components to be internally water cooled and to operate in a very high temperature environment.

SUMMARY OF THE INVENTION

According to the invention there is provided an apparatus for injecting gas into a vessel, comprising:

a gas flow duct extending from a rear end to a forward end from which to discharge gas from the duct;

an elongate body disposed centrally within the forward end of the duct such that gas flowing through the forward end of the duct will flow over and along the elongate central body;

a plurality of flow directing vanes disposed between the elongate central body and the duct to impart swirl to a gas flow through the forward end of the duct;

cooling water supply and return passage means extending through the wall of the duct from its rear end part to its forward end part for supply and return of cooling water to the forward end part of the duct;

internal cooling water passage means within a duct tip at the forward end of the duct communicating with the cooling water supply and return passage means so as to receive and return a flow of cooling water to internally cool the duct tip; and cooling water flow passages within the vanes and the elongate central body and communicating with the cooling water supply and return passage means in the forward end part of the duct for flow of water from the supply passage means inwardly through the vanes into the cooling passages of the elongate central body and from those passages outwardly through the vanes to the water return passage means of the duct.

Preferably, the cooling water supply and return passage means comprises first supply and return passages communicating with the internal cooling water passage means in the duct tip and second supply and return passages communicating with the water flow passages in the vanes and central body.

The tip of the duct may be formed as a hollow annular formation projecting forwardly from the remainder of the duct, the hollow formation defining an annular passage constituting said internal cooling water passage means of the duct tip.

The duct may comprise a series of concentric tubes defining a series of annular spaces providing the water flow supply and return passage means. There may be four such tubes defining three concentric annular spaces. The two outermost annular spaces may provide the water supply and return passages for flow of water to and from the internal cooling water passage means of the duct tip. The innermost annular passage may be internally divided so as to provide water supply and return passages for flow of water to and from the cooling water passages in the vanes and elongate central body.

The central body may be generally of cylindrical formation with domed ends.

Preferably, the vanes are shaped to a multi-start helical formation. The vanes may then be connected to the duct at multiple locations spaced circumferentially around the duct. Specifically, there may be four vanes arranged in a four start helical formation and connected to the duct at four locations spaced at 90 degree intervals around the duct at the forward ends of the vanes.

The cooling water supply passage means within the duct may then be comprised of an appropriate number of separated water flow passages each to supply cooling water to one of the vanes. Such separated water flow passages may be formed by dividers within an appropriate annular passage between tubes of the duct extending helically along the duct.

The forward ends of the duct tubes may be connected at their forward ends to the duct tip. The rear ends of the duct tubes may be mounted to allow relative longitudinal movement between them so as to accommodate differential thermal expansion and contraction of the tubes.

The vanes may be connected to the duct and to the central body parts at their forward ends only so as to be free to move along the duct from those connections under thermal expansion.

BRIEF DESCRIPTION OF THE DRAWINGS

In order that the invention may be more fully explained, one particular embodiment will be described in detail with reference to the accompanying drawings in which.

DESCRIPTION OF THE PREFERRED EMBODIMENT

Figure 1:
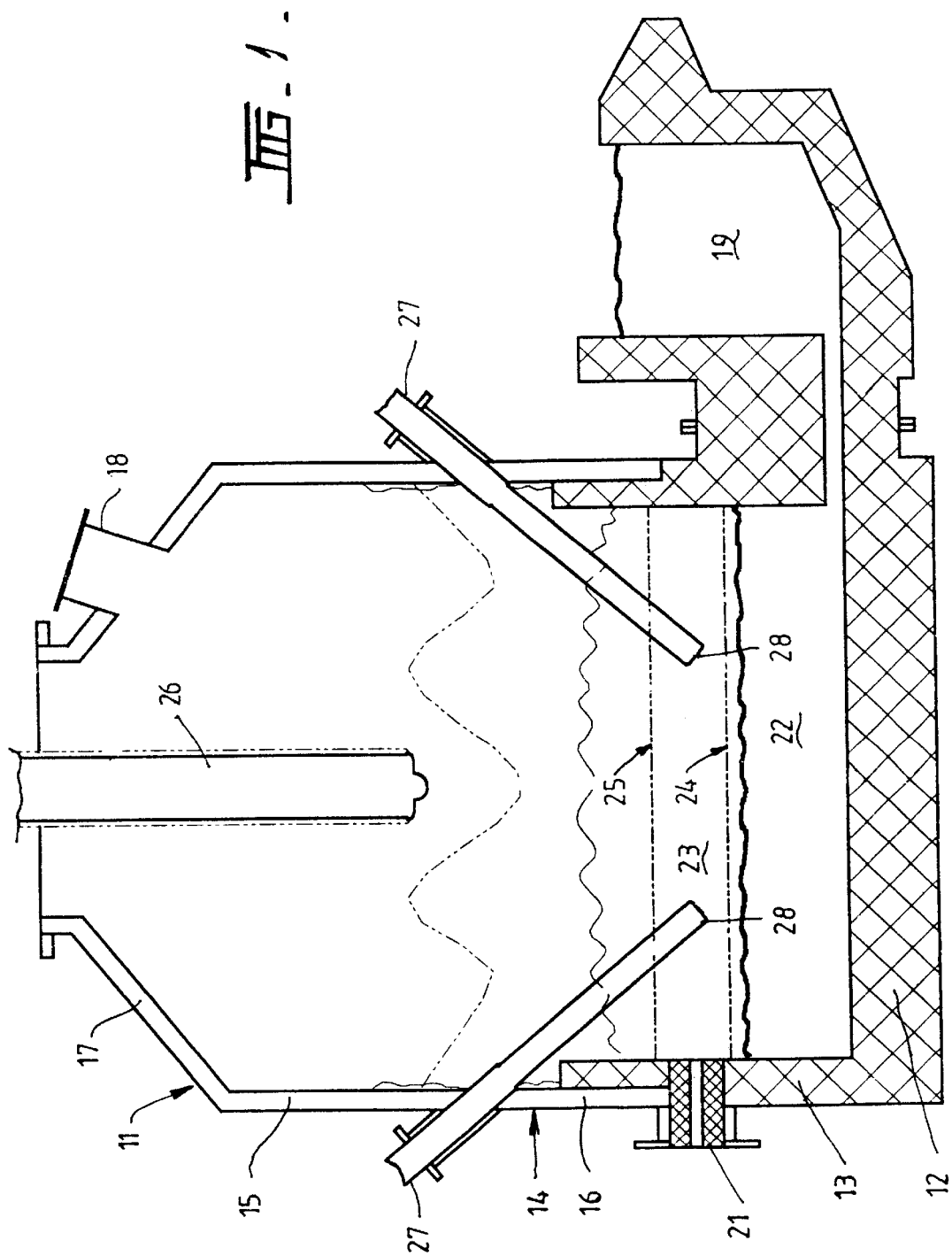
FIG. 1 is a vertical section through a direct smelting vessel incorporating a pair of solids injection lances and a hot air blast injection lance constructed in accordance with the invention.
Figure 2:
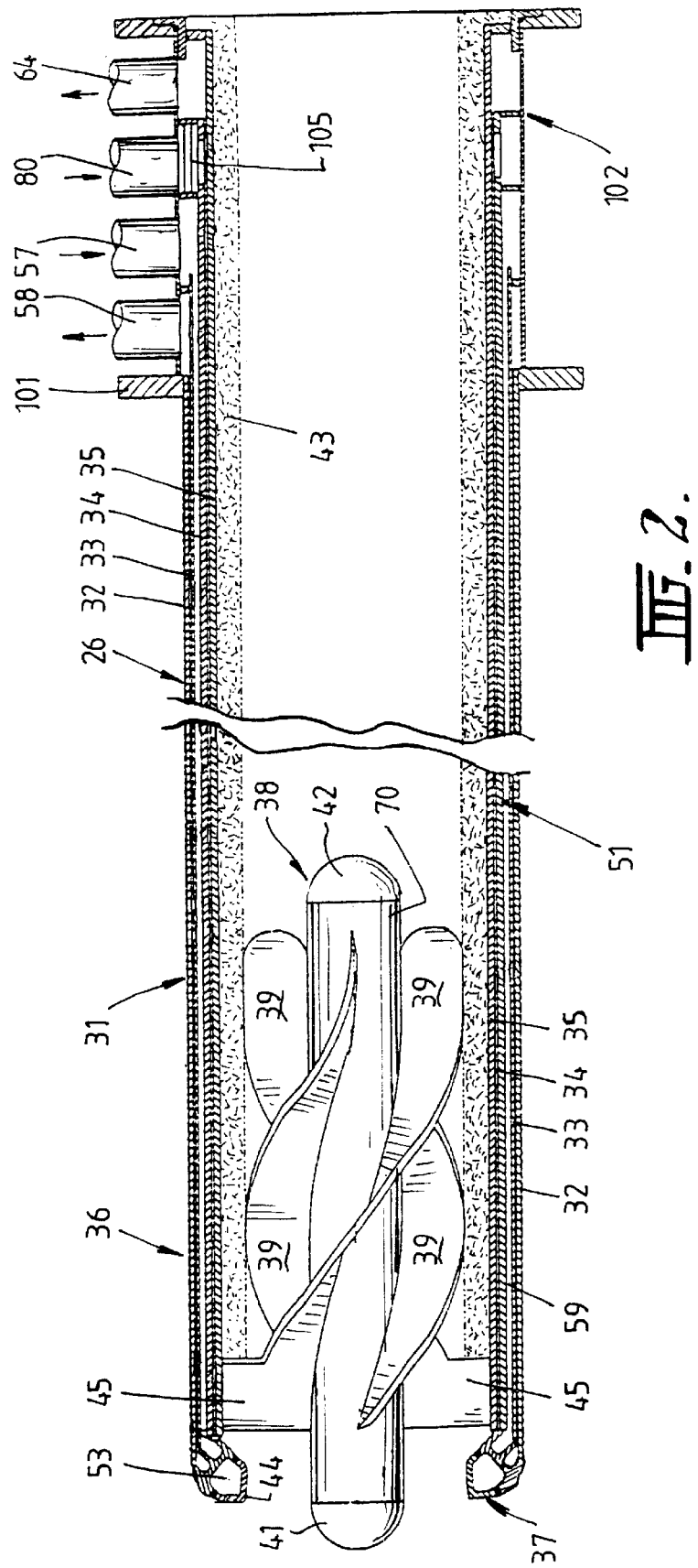
FIG. 2 is a longitudinal cross-section through the hot air injection lance.

FIG. 1 illustrates a direct smelting vessel suitable for operation by the HIsmelt process as described in International Patent Application PCT/AU96/00197. The metallurgical vessel is denoted generally as 11 and has a hearth that incudes a base 12 and sides 13 formed from refractory bricks; side walls 14 which form a generally cylindrical barrel extending upwardly from the sides 13 of the hearth and which incudes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a hot air blast into an upper region of the vessel and two solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

The construction of the hot air injection lance 26 is illustrated in FIGS. 2-9. As shown in these figures, lance 26 comprises an elongate duct 31 through which to pass the flow of hot air, which may be oxygen enriched. Duct 31 is comprised of a series of four concentric steel tubes 32, 33, 34, 35 extending to a forward end part 36 of the duct where they are connected to a tip end piece 37. An elongate body part 38 is disposed centrally within the forward end part 36 of the duct and carries a series of four swirl imparting vanes 39. Central body part 38 is of elongate cylindrical formation with bull-nosed or domed forward and rear ends 41, 42. Vanes 39 are disposed in a four-start helical formation and are connected at their forward ends by radially outwardly extending vane ends 45 to the forward part of the duct.

Duct 31 is internally lined throughout most of its length by an internal refractory lining 43 which fits within the innermost metal tube 35 of the duct and extends through to the forward end parts 42 of the vanes, the vanes 39 fitting neatly within the refractory lining behind these forward end parts 42.

The tip end piece 37 of the duct has a hollow annular head or tip formation 44 which projects forwardly from the remainder of the duct so as to be generally flush with the inner surface of the refractory lining 43 which defines the effective flow passage for gas through the duct. The forward end of central body part 38 projects forwardly beyond this tip formation 44 so that the forward end of the body part and the tip formation co-act together to form an annular nozzle from which the hot air blast emerges in an annular diverging flow with a strong rotational or swirling motion imparted by the vanes 39.

In accordance with the present invention, duct tip formation 44, central body part 38 and vanes 39 are all internally water cooled with flows of cooling water provided by cooling water flow passage means denoted generally as 51 extending through the wall of the duct. Water flow passage means 51 comprises a water supply passage 52 defined by the annular space between the duct tubes 33, 34 to supply cooling water to the hollow interior 53 of duct tip formation 44 via circumferentially spaced openings 54 in tip end piece 37. Water is returned from the tip end piece through circumferentially spaced openings 55 into an annular water return flow passage 56 defined between the duct tubes 32 and 33 and also forming part of the water flow passage means 51. The hollow interior 53 of tip end piece 37 is thus continuously supplied with cooling water to act as an internal cooling passage. The cooling water for the lance tip is delivered into supply passage 52 through an water inlet 57 at the rear end of the lance and the returning water leaves the lance through an outlet 58 also at the rear end of the lance.

The annular space 59 between duct tubes 34 and 35 is divided by helically wound divider bars into eight separated helical passages 60 extending from the rear end of the duct through to the forward end part 36 of the duct. Four of these passages are supplied independently with water through four circumferentially spaced water inlets 62 to provide for independent water supplies for the cooling of vanes 39 and body part 38. Water inlets 62 communicate with a common water supply tube 80 via an annular supply manifold 90. The other four passages 60 serve as return flow passages which are connected to a common annular return manifold passage 63 and a single water outlet 64.

Vanes 39 are of hollow formation and the interiors are divided to form water inlet and outlet flow passages through which water flows to and from the central body part 38 which is also formed with water flow passages for internal water cooling. The forward end parts 45 of vanes 39 are connected to the forward end of innermost duct tube 35 about four water inlet slots 65 through which water flows from the four separately supplied water inlet flow passages into radially inwardly directed inlet passages 66 in the forward ends of the vanes. The cooling water then flows into the forward end of central body part 38.

Central body part 38 is comprised of forward and rear inner body parts 68, 69 housed within a casing 70 formed of a main cylindrical section 71 and domed front and rear end pieces 41, 42 which are hard faced to resist abrasion by refractory grit or other particulate material carried by the hot gas flow. A clearance space 74 between the inner parts 68, 69 and the outer casing of the central body part is subdivided into two sets of peripheral water flow passages 75, 76 by means of divider ribs 77, 78 formed on the outer peripheral surfaces of the inner body parts 68, 69. The forward set of peripheral water flow channels 75 are arranged to fan out from the front end of the central body part in the manner shown in FIG. 8 and backwardly around the body. A flow guide insert 81 is located centrally within the inner body part 68 to extend through the water flow passage 67 and to divide that passage into four circumferentially spaced water flow passages which independently receive the incoming flows of water through the water inlet passages 66 in the forward ends of the vanes, so maintaining four independent water inlet flows through to the front end of the central body part. These separate water flows communicate with the four front peripheral water flow channels 75 through which water flows back around the forward end of the central body part.

A baffle plate 82 divides the water inlet passages 66, 67 in the forward ends of the vanes and the central body part from water flow passages in the rear parts of the vanes and the central body part. The water flowing back through the forward peripheral channels 75 extends through slots 83 in this baffle located between the inlet passages 66 so as to flow back into a central passage 84 in the rear body part 69. This passage is also divided into four separate flow channels by means of a central flow guide 85 to continue the four separate water flows through to the rear end of the central body. The rear peripheral flow channels 76 are also arranged in a set of four in similar fashion to the by-passages 75 at the front end of the central body so as to receive the four separate water flows at the rear end of the body and to take them back around the periphery of the body back to four circumferentially spaced outlet slots 86 in the casing through which the water flows into return passage 87 in the vanes.

Figure 3:
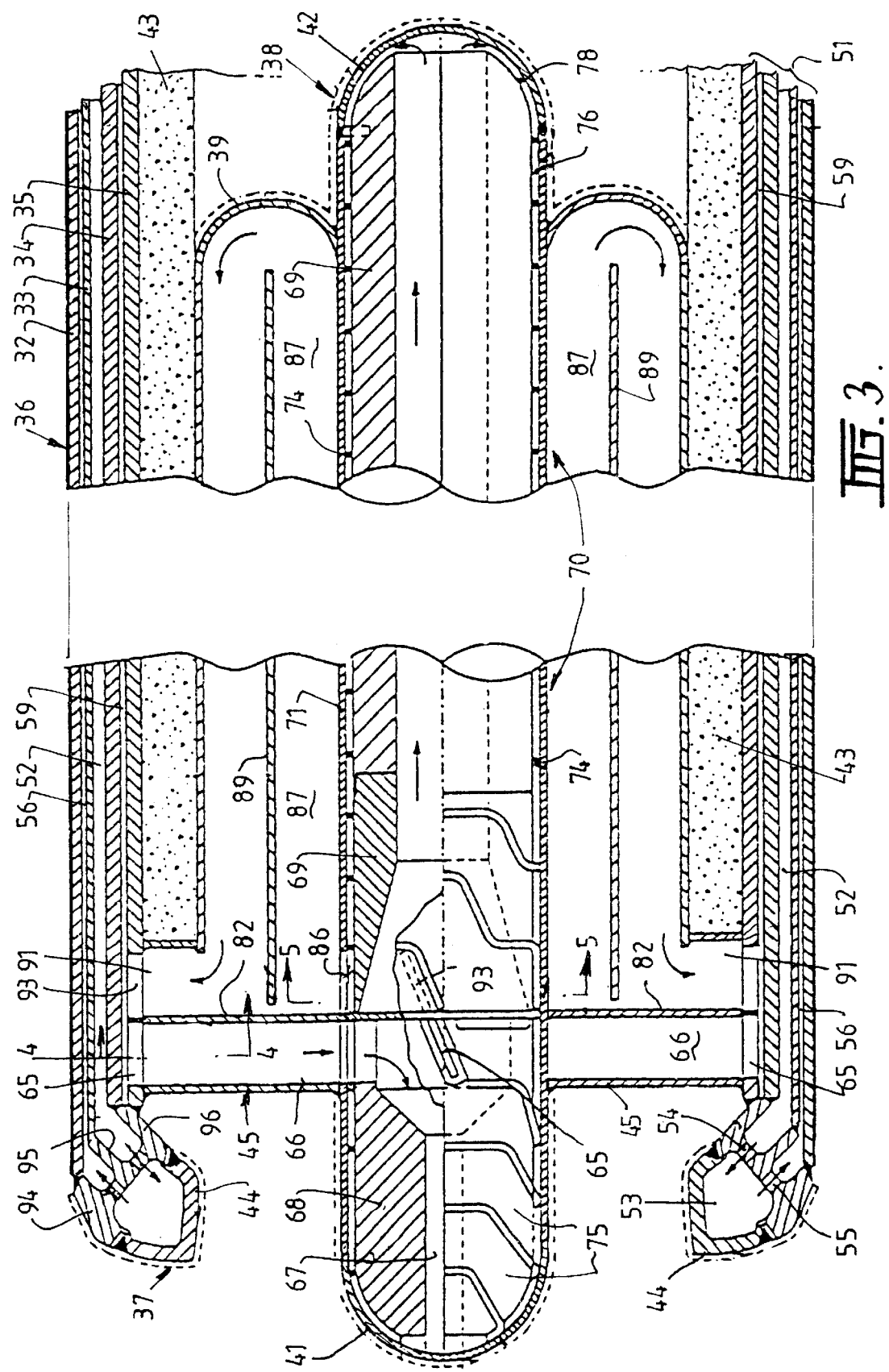
FIG. 3 is a longitudinal cross-section to an enlarged scale through a forward end part of the lance.
Figure 4:
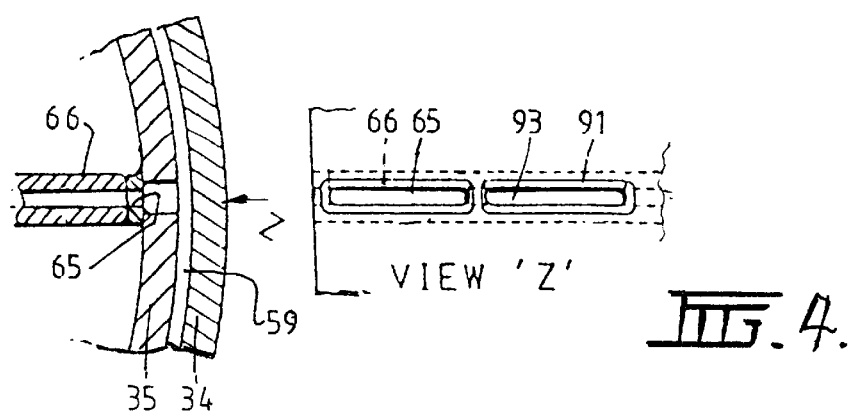
FIG. 4 is a cross-section on the line 4-4 in FIG. 3.
Figure 5:
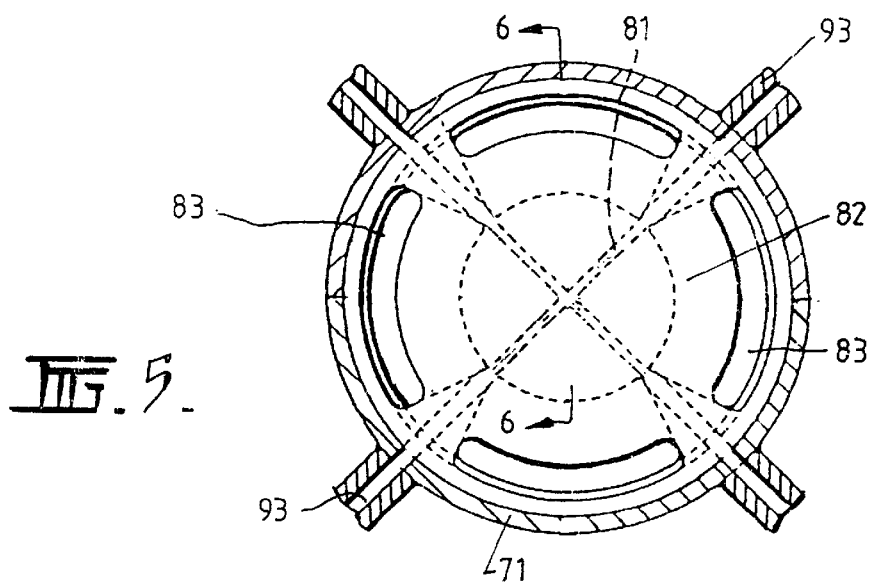
FIG. 5 is a cross-section on the line 5-5 in FIG. 3.
Figure 6:
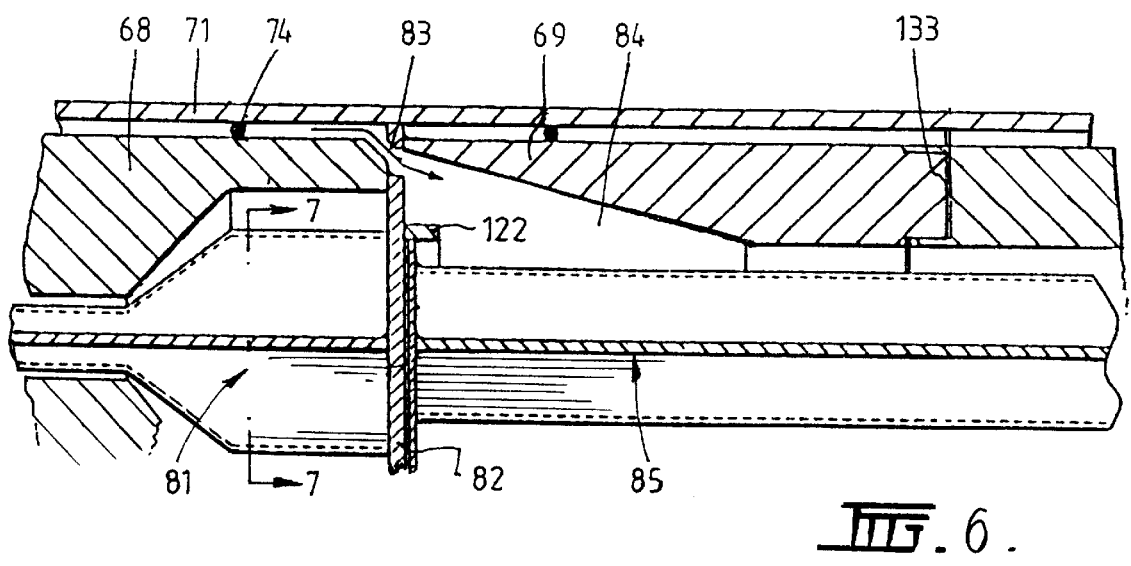
FIG. 6 is a cross-section on the line 6-6 in FIG. 5.
Figure 7:
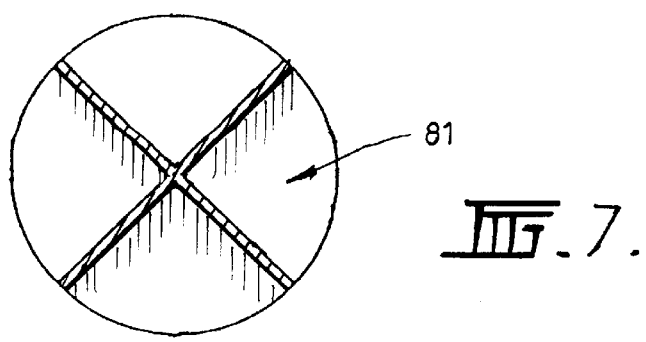
FIG. 7 is a cross-section on the line 7-7 in FIG. 6.
Figure 8:
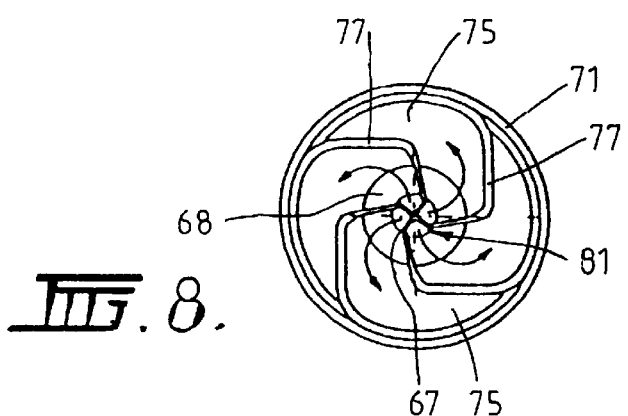
FIG. 8 illustrates water flow passages formed in a forward part of a central body disposed with the forward end of the lance.
Figure 9:
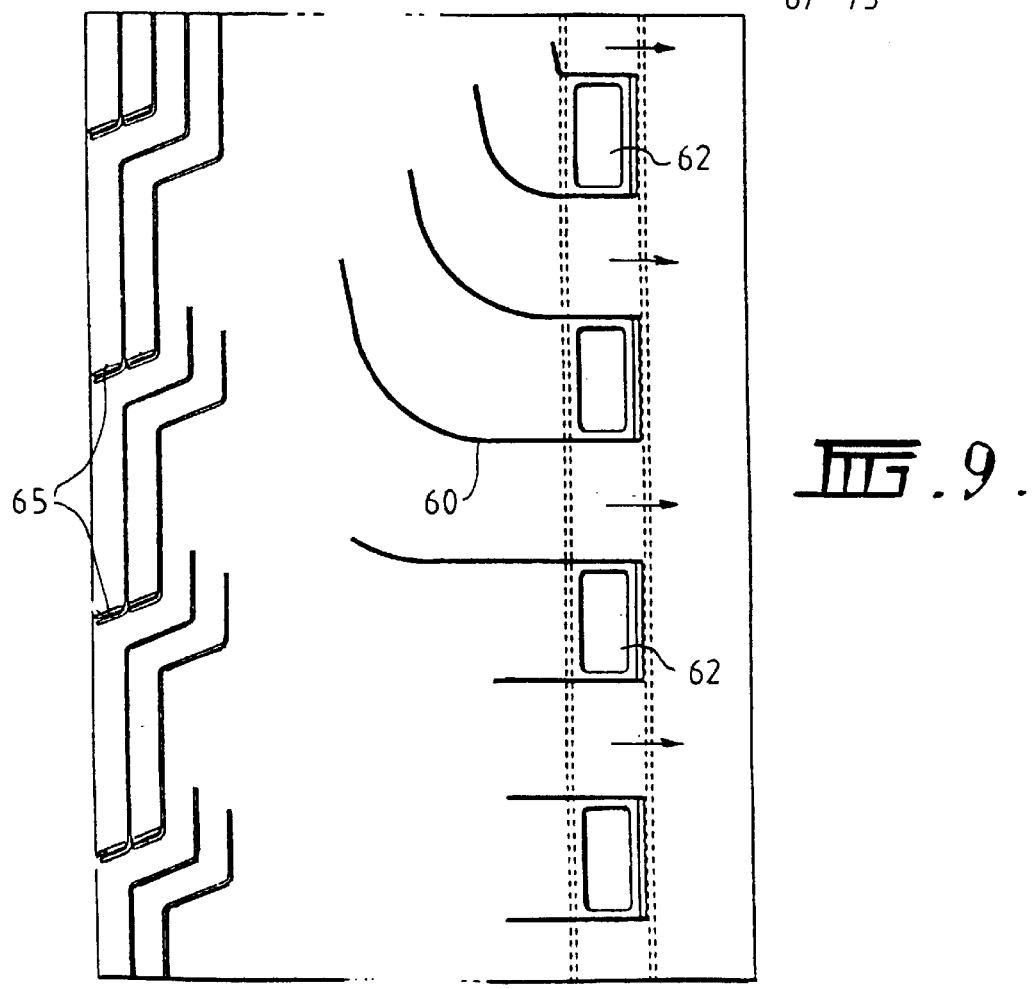
FIG. 9 is a development showing the arrangement of inlet and return water galleries for the central body part and four flow swirl vanes in the forward part of the lance.

The hollow vanes are divided internally by longitudinal baffles 89 so that the cooling water passages extend from the inner forward ends of the vanes back to the rear ends of the vanes then outwardly and forwardly along the outer longitudinal ends of the vanes to radially extending water outlet passages 91 in the forward ends 42 of the vanes which communicate through outlet slots 93 with the four circumferentially spaced return passages extending back through the duct wall to the common outlet 64 at the rear end of the duct. Baffle 82 divides the inlet and outlet passages 66, 91 within the vanes and the water inlet and outlet flow slots 65, 93 for each vane are formed in the forward end of the inner duct tube 35 at an angle to the longitudinal direction to suit the helix angle of the vanes as seen in FIG. 3.

Figure 10:
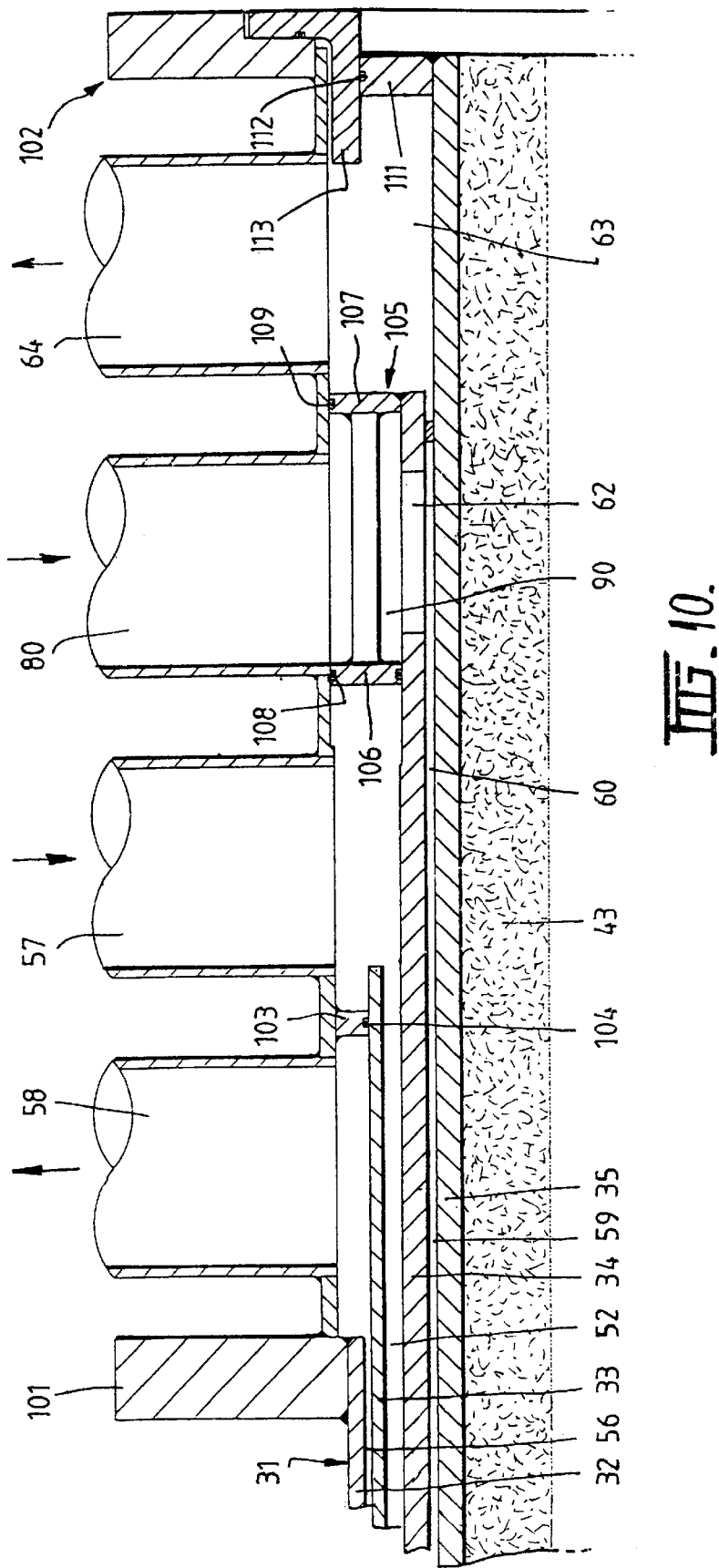
FIG. 10 is an enlarged cross-section through a rear part of the lance.

The forward ends of the four concentric duct tubes 32, 33, 34, 35 are welded to three flanges 94, 95, 96 of the tip piece 55 so that they are firmly connected into a strong structure at the forward end of the lance. The rear ends of the duct tubes can move longitudinally with respect to one another to allow for differential thermal expansion during operation of the lance. As most clearly seen in FIG. 10, the rear end of duct tube 32 is provided with an outstanding flange 101 to which there is welded a continuous structure 102 which carries the various water inlets and outlets 57, 58, 62, 64. Structure 102 includes an internal annular flange 103 fitted with an 0-ring seal 104 which serves as a sliding mounting for the rear end of duct tube 33, so allowing the duct tube 33 to expand and contract longitudinally independently of the outer duct tube 32. A structure 105 welded to the rear end of duct tube 34 includes annular flanges 106, 107 fitted with O-ring seals 108, 109 which provide a sliding mounting for the rear end of the duct tube 34 within the outer structure 102 fixed to the rear end of duct tube 32 so that duct tube 34 can also expand and contract independently of duct tube 32. The rear end of the inner most duct tube 35 is provided with an outstanding flange 111 fitted with an O-ring seal 112 which engages an annular ring 113 fitted to the outer structure 102 so as to also provide a sliding mounting for the innermost duct tube allowing for independent longitudinal expansion and contraction.

Provision is also made for thermal expansion of the flow guide vanes 39 and the inner body part 38. The vanes 39 are connected to the duct and to the inner body part only at their forward ends and in particular at the locations where there are water inlet and outlet flows at the inner and outer parts of the forward ends of the vanes. The main parts of the vanes simply fit between the refractory lining 43 of the duct and the casing of central body part 38 and are free to expand longitudinally. The water flow divider 85 within the rear section of the inner body part has a circular front end plate which slides within a machined surface of a tubular spigot 122 on baffle 82 so as to permit the forward and rear parts of the central body part to move apart under thermal expansion while maintaining sealing between the separated water flow passages. A thermal expansion joint 133 is provided to accommodate the thermal expansion between the forward and front ends of the central body part.

To further allow for thermal expansion, the vanes 39 may be shaped so as they do not extend radially outwardly between the casing of the central body part and the refractory lining of the duct when viewed in cross-section but such that they are slightly offset at an angle to the truly radial direction when the lance tubes and central body are in a cold condition. Subsequent expansion of the duct tubes during operation of the lance will allow the vanes to be drawn toward truly radial positions while maintaining proper contact with the duct lining and central body part while avoiding radial stresses on the vanes due to thermal expansion.

In operation of the illustrated hot air injection lance, independent cooling water flows are delivered to the four swirl vanes 39 so there can be no loss of cooling efficiency due to differential flow effects. The independent cooling water flows are also provided to the forward and rear ends of the central body part 38 so as to eliminate hot spots due to lack of water flow because of possible preferential flow effects. This is particularly critical for cooling of the forward end 41 of the central body part which is exposed to extremely high temperature conditions within the smelting vessel.

The duct tubes can expand and contract independently in the longitudinal direction under thermal expansion and contraction effects and the vanes and central body parts are also able to expand and contract without impairing the structural integrity of the lance or maintenance of the various independent flows of cooling water.

The illustrated lance is capable of operating under extreme temperature conditions within a direct smelting vessel in which molten iron is produced by the high smelt process. Typically the cooling water flow rate through the four swirl vanes and the central body part will be of the order of 90 m³/Hr and the flow rate through the outer housing and the lance tip will be of the order of 400 m³/Hr. The total flow rate may therefore be of the order of 490 m³/Hr at a maximum operating pressure of the order of 1500 kPag.

Although the illustrated lance has been designed for injection of a hot air blast into a direct smelting vessel, it will be appreciated that similar lances may be used for injecting gases into any vessel in which high temperature conditions prevail, for example for the injection of oxygen, air or fuel gases into furnace vessels.

It is accordingly to be understood that the invention is in no way limited to the details of the illustrated construction and that many modifications and variations will fall within the scope of the appended claims.

What is claimed is:

1. An apparatus for injecting gas into a vessel, comprising:
   a gas flow duct extending from a rear end to a forward end from which to discharge gas from the duct;
   an elongate body of generally cylindrical formation having domed rear and forward ends and disposed centrally within the forward end of the duct such that gas flowing through the forward end of the duct will flow over and along the elongate central body;
   a plurality of flow directing vanes disposed between the elongate central body and the duct to impart swirl to a gas flow through the forward end of the duct;
   cooling water supply and return passage means extending through the wall of the duct from its rear end part to its forward end part for supply and return of cooling water to the forward end part of the duct;
   an annular duct tip disposed at the forward end of the duct and having an internal tip cooling water passage communicating with the cooling water supply and return passage means so as to receive and return a flow of cooling water to internally cool the duct tip; and
   cooling water flow passages within the vanes and the elongate central body and communicating with the cooling water supply and return passage means in the forward end part of the duct for flow of water from the supply passage means inwardly through the vanes into the cooling passages of the elongate central body and from those passages outwardly through the vanes to the water return passage means of the duct.

2. An apparatus as claimed in claim 1, wherein the tip of the duct is formed as a hollow annular formation projecting forwardly from the remainder of the duct, the hollow formation defining an annular passage constituting said internal tip cooling water passage.

3. An apparatus as claimed in claim 1, wherein the cooling water supply and return passage means comprises first supply and return passages communicating with the internal cooling water passage means in the duct tip and second supply and return passages communicating with the water flow passages in the vanes and central body.

4. An apparatus as claimed in claim 3, wherein the duct comprises a series of concentric tubes defining a series of annular spaces providing the water flow supply and return passage means.

5. An apparatus as claimed in claim 4, wherein there are four of said concentric tubes defining three concentric annular spaces.

6. An apparatus as claimed in claim 5, wherein the two outermost annular spaces provide the water supply and return passages for flow of water to and from the internal cooling water passage means of the duct tip.

7. An apparatus as claimed in claim 4, wherein the innermost annular passage is internally divided so as to provide water supply and return passages for flow of water to and from the cooling water passages in the vanes and elongate central body.

8. An apparatus as claimed in claim 4, wherein the forward ends of the duct tubes are connected to the duct tip.

9. An apparatus as claimed in claim 8, wherein the rear ends of the duct tubes are mounted to allow relative longitudinal movement between them so as to accommodate differential thermal expansion and contraction of the tubes.

10. An apparatus as claimed in claim 1, wherein the forward end of the central body projects forwardly beyond the duct tip so that the forward end of the central body and the duct tip co-act together to form an annular nozzle for divergent flows of gas from the duct with swirl imparted by said vanes.

11. An apparatus as claimed in claim 1, wherein the domed ends of central body are hard faced to resist abrasion by particulate material carried by the gas flow.

12. An apparatus as claimed in claim 1, wherein the vanes are shaped to a multi-start helical formation.

13. An apparatus as claimed in claim 12, wherein the vanes are connected to the duct at multiple locations spaced circumferentially around the duct.

14. An apparatus as claimed in claim 13, wherein there are four vanes arranged in a four start helical formation and connected to the duct at four locations spaced at 90 degree intervals around the duct at the forward ends of the vanes.

15. An apparatus as claimed in claim 13, wherein the cooling water supply passage means within the duct is comprised of an appropriate number of separated water flow passages each to supply cooling water to one of the vanes.

16. An apparatus as claimed in claim 15, wherein said separated water flow passages are formed by dividers within an annular passage of the duct extending helically along the duct.

17. An apparatus as claimed in claim 15, wherein there are separated water flow passages in the central body connected one to each of the water flow passages in the vanes.

18. An apparatus as claimed in claim 17, wherein the cooling water passages in the vanes comprise inlet sections within forward parts of the vanes for flow of cooling water from the cooling water supply passage means in the forward part of the duct radially inwardly into the separated water flow passages in the central body and return sections within rear parts of the vanes for return flow of water from the cooling water flow passages in the central body to the return passage means in the duct.

19. An apparatus as claimed in claim 18, wherein the cooling water passages in the central body comprise forward passage sections in the forward part of the central body to receive water from the inlet passage sections in the vanes and to pass it about the periphery of that forward part of the central body and rearward passage sections in the rear part of the central body to receive water from the forward passage sections and pass it about the periphery of the rear part of the central body and into the return passage sections in the rear parts of the vanes.

20. An apparatus as claimed in claim 1, wherein the vanes are connected to the duct and to the central body at their forward ends only so as to be free to move along the duct from those connections under thermal expansion.

* * * * *